(12) United States Patent
Nakanishi et al.

(10) Patent No.: US 7,615,311 B2
(45) Date of Patent: Nov. 10, 2009

(54) NON-AQUEOUS ELECTROLYTE AND ELECTROCHEMICAL DEVICE USING THE SAME

(75) Inventors: Shinji Nakanishi, Osaka (JP); Hizuru Koshina, Osaka (JP)

(73) Assignee: Panasonic Corporation, Osaka (JP)

( * ) Notice: Subject to any disclaimer, the term of this patent is extended or adjusted under 35 U.S.C. 154(b) by 723 days.

(21) Appl. No.: 11/359,416

(22) Filed: Feb. 23, 2006

(65) Prior Publication Data

US 2006/0188787 A1   Aug. 24, 2006

(30) Foreign Application Priority Data

Feb. 23, 2005   (JP)   ............................. 2005-046787

(51) Int. Cl.
    *H01M 6/04* (2006.01)
(52) U.S. Cl. ..................... 429/188; 429/33; 429/206
(58) Field of Classification Search ............ 429/33, 429/188, 324
    See application file for complete search history.

(56) References Cited

U.S. PATENT DOCUMENTS 5,453,336 A * 9/1995 Adler et al. ............... 429/207

2005/0003270 A1 * 1/2005 Phillips ..................... 429/223

FOREIGN PATENT DOCUMENTS

| JP | 11-250933 | 9/1999 |
| JP | 11250933 A * | 9/1999 |
| JP | 2000-058113 | 2/2000 |

\* cited by examiner

*Primary Examiner*—Dah-Wei D Yuan
*Assistant Examiner*—Stephan Essex
(74) *Attorney, Agent, or Firm*—McDermott Will & Emery LLP

(57) ABSTRACT

This invention relates to a non-aqueous electrolyte including: a first solute; a second solute; and an organic solvent dissolving the first solute and the second solute. The first solute is a salt having at least one fluorine atom in an anion moiety thereof, and the second solute is an inorganic borate having at least one boron atom and at least one oxygen atom in an anion moiety thereof. The inclusion of the second solute in the non-aqueous electrolyte makes it possible to reduce the amount of gas produced even if an electrochemical device including the non-aqueous electrolyte is stored at high temperatures. It is also possible to improve the high-rate discharge characteristics and discharge cycle characteristics.

4 Claims, 1 Drawing Sheet

NON-AQUEOUS ELECTROLYTE AND ELECTROCHEMICAL DEVICE USING THE SAME

FIELD OF THE INVENTION

The present invention relates to a non-aqueous electrolyte and an electrochemical device using the same.

BACKGROUND OF THE INVENTION

Electrochemical devices utilizing an organic solvent as an ion transport medium are used in various electric or electronic devices. Electrochemical devices include batteries and electrochemical capacitors. Among them, non-aqueous electrolyte secondary batteries, in particular, have high energy densities and can be made smaller and lighter, so their research and development is actively underway.

A non-aqueous electrolyte secondary battery includes a positive electrode, a negative electrode, a non-aqueous electrolyte, and a separator (separating film) interposed between the positive electrode and the negative electrode. A conventional non-aqueous electrolyte is composed of a non-aqueous solvent, such as ethylene carbonate or dimethyl carbonate, and a solute containing an alkali metal salt, such as $LiPF_6$, which is dissolved in the non-aqueous solvent. As the separator, for example, a porous film made of polyethylene resin or polypropylene resin is used.

However, since such non-aqueous electrolyte secondary batteries are configured so as to provide high voltage and high energy density, decomposition of the non-aqueous electrolyte by oxidation occurs on the positive electrode side. The decomposition of the non-aqueous electrolyte by oxidation becomes more remarkable as the battery temperature becomes higher. For example, when stored at high temperatures between 60° C. and 85° C., the non-aqueous electrolyte is decomposed by reduction or oxidation, to produce large amounts of gas.

Also, these non-aqueous electrolyte secondary batteries have recently been widely used as a power source for notebook personal computers. A notebook personal computer is usually connected to an external power source, and it is often supplied with electricity from the external power source. At this time, the non-aqueous electrolyte secondary battery with which the notebook personal computer is equipped is constantly fully charged with the electricity from the external power source. Further, when the personal computer is operated, the temperature inside the battery reaches 45° C. or higher. Keeping charging the battery to a fully charged state of 4.2 V at such temperatures is a more harsh condition than storing the battery in an environment of 60° C. after it has been fully charged. Thus, in the former condition, gas tends to be produced inside the battery.

When a battery is stored at such high temperatures and in a constantly fully charged state, large amounts of gas is produced, and battery characteristics therefore degrade. Alternatively, due to the large amounts of the produced gas, the internal pressure of the battery rises so that a safety device is actuated to interrupt the current, after which charge/discharge becomes impossible. Therefore, it is strongly desired to suppress gas production during storage in a full charged state.

In order to solve the problems as described above, for example, an additive that is capable of forming a coating film on the positive electrode and/or negative electrode is incorporated into a battery. For example, a divalent phenol derivative is added to a non-aqueous electrolyte (see Japanese Patent No. 2928779).

However, although conventionally known additives have the effect of suppressing gas production, many of them lower the electronic conductivity, thereby impairing the charge/discharge characteristics of the battery. For example, the incorporation of an additive into a battery leads to degradation in the low-temperature discharge characteristics and/or charge/discharge cycle characteristic of the battery.

BRIEF SUMMARY OF THE INVENTION

The present invention relates to a non-aqueous electrolyte including: a first solute; a second solute; and an organic solvent dissolving the first solute and the second solute. The first solute is a salt having at least one fluorine atom in an anion moiety thereof, and the second solute is an inorganic borate having at least one boron atom and at least one oxygen atom in an anion moiety thereof.

In the non-aqueous electrolyte, it is preferred that the inorganic borate comprise at least one selected from the group consisting of the following formulas (1) to (6):

$$\text{a tetraborate represented by } M_x(B_4O_7) \quad (1)$$

where M is an alkali metal or an alkaline earth metal; when M is an alkali metal, x=2, and when M is an alkaline earth metal, x=1;

$$\text{a borate represented by } R_y(BO_3)_z \quad (2)$$

where R is an alkali metal, an alkaline earth metal, or a rare-earth metal; when R is an alkali metal, y=3 and z=1, when R is an alkaline earth metal or a divalent rare-earth metal, y=3 and z=2, and when R is a trivalent rare-earth metal, y=1 and z=1;

$$\text{a metaborate represented by } M(BO_2)_v \quad (3)$$

where M is an alkali metal or an alkaline earth metal; when M is an alkali metal, v=1, and when M is an alkaline earth metal, v=2;

$$\text{a diborate represented by } M_w(B_2O_5) \quad (4)$$

where M is an alkali metal or an alkaline earth metal; when M is an alkali metal, w=4, and when M is an alkaline earth metal, w=2;

$$\text{a pentaborate represented by } LB_5O_7 \quad (5)$$

where L is an alkali metal; and $$\text{a hypoborate represented by } M_u(B_2O_4) \quad (6)$$

where M is an alkali metal or an alkaline earth metal; when M is an alkali metal, u=4, and when M is an alkaline earth metal, u=2.

In the non-aqueous electrolyte, the anion moiety of the first solute is preferably at least one selected from the group consisting of $PF_6^-$, $BF_4^-$, $AsF_6^-$, $SbF_6^-$, and $[PF_\alpha(C_\beta X_{(2\beta+1)})_{(6-\alpha)}]^-$ where X is H or F, α is an integer from 1 to 5, and β is an integer from 1 to 5.

The non-aqueous electrolyte preferably has a second solute concentration of 0.005 mol/L or more and 0.75 mol/L or less.

The present invention also pertains to an electrochemical device including at least two electrodes, a separator interposed between the at least two electrodes, and the above-mentioned non-aqueous electrolyte.

While the novel features of the invention are set forth particularly in the appended claims, the invention, both as to organization and content, will be better understood and

DETAILED DESCRIPTION OF THE INVENTION

Figure 1:
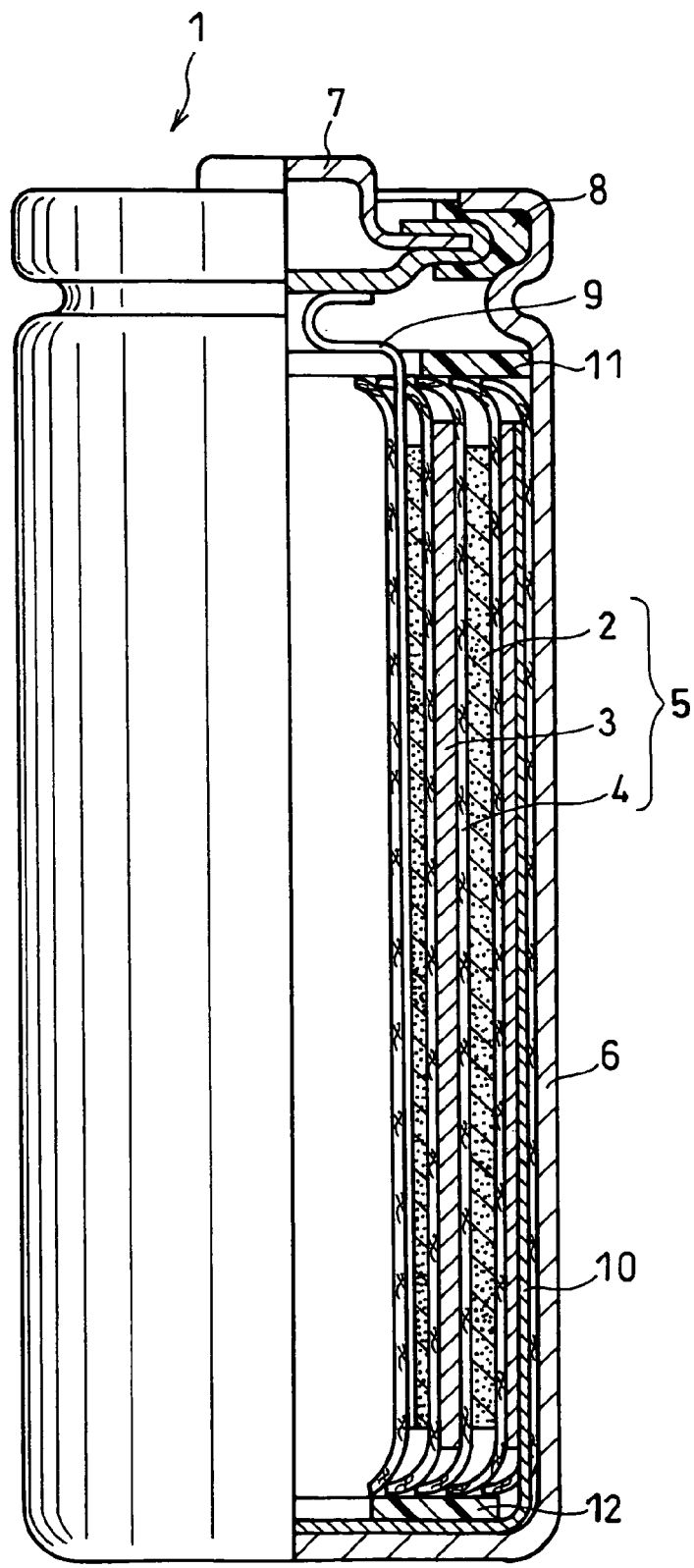
FIG. 1 is a schematic longitudinal sectional view of a cylindrical lithium secondary battery produced in an Example of the present invention.

A non-aqueous electrolyte in accordance with the present invention includes: a first solute; a second solute; and an organic solvent dissolving the first solute and the second solute. The first solute is a salt having at least one fluorine atom in the anion moiety thereof, and the second solute is an inorganic borate having at least one boron atom and at least one oxygen atom in the anion moiety thereof. The anion moiety of the inorganic borate contains no carbon atom.

The present inventors have found that the second solute included in the non-aqueous electrolyte makes it possible to provide an electrochemical device in which the amount of gas production can be reduced during high-temperature storage without impairing battery characteristics. The reason is probably as follows, though not clear in detail, in the case of non-aqueous electrolyte secondary batteries. When a non-aqueous electrolyte secondary battery is subjected to an initial charge, a stable coating film derived from the inorganic borate is formed on the positive and negative electrodes due to electrochemical reaction. This coating film suppresses the oxidation reaction of the non-aqueous electrolyte on the positive and negative electrodes, thereby reducing the amount of gas produced during high-temperature storage and improving discharge characteristics, storage characteristics, and cycle characteristics. Such effects can also be obtained in other electrochemical devices such as capacitors.

In addition to the second solute, the non-aqueous electrolyte of the present invention includes the first solute that comprises a salt having at least one fluorine atom in the anion moiety thereof, and the first solute promotes the above-mentioned effects. Inorganic borates are inherently difficult to dissolve in organic solvents. However, the first solute is believed to promote the dissolution of the inorganic borate into the organic solvent and hence the above-mentioned effects.

The second solute may be fully dissolved in the non-aqueous electrolyte, or a part thereof may remain undissolved.

As the organic solvent contained in the non-aqueous electrolyte, various substances may be used. Exemplary organic solvents include: cyclic carbonic acid esters such as propylene carbonate, ethylene carbonate, butylene carbonate, and vinylene carbonate; chain carbonic acid esters such as dimethyl carbonate, diethyl carbonate, and methyl ethyl carbonate; lactones such as γ-butyrolactone, γ-valerolactone, and δ-valerolactone or derivatives thereof; furans such as tetrahydrofuran and 2-methyltetrahydrofuran or derivatives thereof; ethers such as 1,2-dimethoxyethane and 1,2-diethoxyethane; amides such as N,N-dimethylformamide and N-methyl-pyrrolidinone; alcohols such as ethylene glycol and propylene glycol; esters such as methyl acetate, ethyl acetate, methyl propionate, and ethyl propionate; phosphoric acids or phosphoric acid esters; dimethyl sulfoxide, sulfolane or derivatives thereof; dioxolane or derivatives thereof. They may be used singly or in combination of two or more of them.

The inorganic borate preferably comprises at least one selected from the group consisting of the following formulas (1) to (6):

a tetraborate represented by $M_x(B_4O_7)$     (1)

where M is an alkali metal or an alkaline earth metal; when M is an alkali metal, x=2, and when M is an alkaline earth metal, x=1;

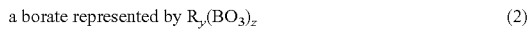

a borate represented by $R_y(BO_3)_z$     (2)

where R is an alkali metal, an alkaline earth metal, or a rare-earth metal; when R is an alkali metal, y=3 and z=1, when R is an alkaline earth metal or a divalent rare-earth metal, y=3 and z=2, and when R is a trivalent rare-earth metal, y=1 and z=1;

a metaborate represented by $M(BO_2)_v$     (3)

where M is an alkali metal or an alkaline earth metal; when M is an alkali metal, v=1, and when M is an alkaline earth metal, v=2;

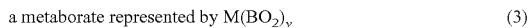

a diborate represented by $M_w(B_2O_5)$     (4)

where M is an alkali metal or an alkaline earth metal; when M is an alkali metal, w=4, and when M is an alkaline earth metal, w=2;

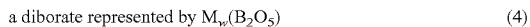

a pentaborate represented by $LB_5O_7$     (5)

where L is an alkali metal; and

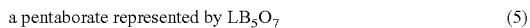

a hypoborate represented by $M_u(B_2O_4)$     (6)

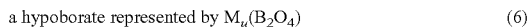

where M is an alkali metal or an alkaline earth metal; when M is an alkali metal, u=4, and when M is an alkaline earth metal, u=2. These inorganic borates are easy to dissolve in an organic solvent and hence a homogeneous non-aqueous electrolyte can be obtained.

In the salt having at least one fluorine atom in the anion moiety, the anion moiety is preferably at least one selected from the group consisting of $PF_6^-$, $BF_4^-$, $AsF_6^-$, $SbF_6^-$, and $[PF_\alpha(C_\beta X_{(2\beta+1)})_{(6-\alpha)}]^-$ where X is H or F, α is an integer from 1 to 5, and β is an integer from 1 to 5. Such salts are highly soluble in an organic solvent and capable of increasing the ionic conductivity of the non-aqueous electrolyte.

In the present invention, the cation moiety of the salt having at least one fluorine atom in the anion moiety is not particularly limited. The cation moiety may be, for example, an alkali metal ion, an alkaline earth metal ion, or a tetraalkylammonium ion.

The concentration of the second solute in the non-aqueous electrolyte is preferably 0.005 mol/L or more and 0.75 mol/L or less. When the concentration of the second solute is in this range, the inorganic borate produces the above-described effects and the ionic conductivity of the non-aqueous electrolyte becomes high. If the second solute concentration is less than 0.005 mol/L, the effects of the inorganic borate become insufficient. If the second solute concentration exceeds 0.75 mol/L, the second solute does not dissolve completely and a part thereof remains solid, which may result in a decrease in ionic conductivity of the non-aqueous electrolyte.

It should be noted that there is a possibility that a part of the dissolved second solute may be changed in composition or the like due to decomposition by the reaction. Even in this case, as long as the concentration of the existing second solute is in the above range, sufficient effects of the present invention can be obtained.

The concentration of the first solute in the non-aqueous electrolyte is preferably 0.5 mol/L or more and 2 mol/L or less. If the first solute concentration is less than 0.5 mol/L, the ionic conductivity of the non-aqueous electrolyte lowers significantly, thereby increasing the internal resistance of the battery and degrading battery characteristics. If the first solute concentration exceeds 2 mol/L, the viscosity of the non-aqueous electrolyte increases, thereby lowering the ionic conductivity of the non-aqueous electrolyte and degrading battery characteristics.

The above-described non-aqueous electrolyte is used as an electrolyte for electrochemical devices such as batteries and electrochemical capacitors. In electrochemical devices including the non-aqueous electrolyte of the present invention, the electrode materials, such as positive electrode material and negative electrode material, and the separator, for example, may be composed of any material that is conventionally known in the art.

Exemplary positive electrode materials for batteries include: lithium cobaltate ($LiCoO_2$), lithium nickelate ($LiNiO_2$), lithium manganates ($LiMn_2O_4$, $LiMnO_2$), and lithium ferrate ($LiFeO_2$); materials in which a part of the transition element (Co, Ni, Mn, Fe) of the above-mentioned materials is replaced with another transition element, tin, aluminum, or the like; lithium compounds with an olivine structure such as lithium iron phosphate, lithium manganese phosphate, lithium cobalt phosphate, and lithium nickel phosphate; transition metal oxides such as vanadium oxide ($V_2O_5$), manganese dioxide ($MnO_2$), and molybdenum oxides ($MoO_2$, $MoO_3$); transition metal sulfides such as iron sulfate ($FeSO_4$), titanium sulfide ($TiS_2$), molybdenum sulfides ($MoS_2$, $MoS_3$), and iron sulfide ($FeS_2$); and polymers such as polyaniline, polypyrrole, and polythiophene.

Exemplary negative electrode materials for batteries include: amorphous carbon materials capable of absorbing and desorbing lithium ions, sodium ions, or the like; carbon materials such as natural graphite and artificial graphite that is baked at temperatures of 2000° C. or more; alkali metals; metals alloyed with alkali metals such as aluminum (Al), lead (Pb), tin (Sn), bismuth (Bi), and silicon (Si) and oxides thereof; cubic intermetallic compounds in which alkali metal is inserted between lattices thereof (AlSb, $Mg_2Si$, $NiSi_2$); lithium nitrogen compounds ($Li_{(3-x)}M_xN$ where M is a transition element); and spinel-type Li—Ti oxides.

An exemplary electrode material for capacitors is active carbon.

The separator for batteries has the function of insulating the positive electrode from the negative electrode. For example, a micro-porous film made of polyethylene or polypropylene may be used as the separator. It is also possible to use, as the separator, a gel electrolyte comprising a polymer impregnated with an electrolyte, for example, the above-mentioned non-aqueous electrolyte. Also, the separator for batteries may be used as the separator for capacitors.

Also, when the electrochemical device is a non-aqueous electrolyte secondary battery, the battery may be of various shapes, such as coin, button, sheet, cylindrical, and rectangular shapes.

The present invention is hereinafter described by way of Examples. These Examples, however, are not to be construed as limiting in any way the present invention.

EXAMPLE 1

In this example, a cylindrical non-aqueous electrolyte secondary battery as illustrated in FIG. 1 was produced.

In FIG. 1, a secondary battery 1 includes power generating elements and a battery can 6 accommodating the power generating elements. The battery can 6 serves as the negative electrode terminal.

The power generating elements include an electrode plate group 5 and a non-aqueous electrolyte (not shown). The electrode plate group 5 includes a positive electrode plate 2, a negative electrode plate 3, and a separator 4 interposed between the positive electrode plate 2 and the negative electrode plate 3, which are spirally rolled up. The positive electrode plate 2 comprises a positive electrode current collector sheet and a positive electrode mixture layer carried on each side of the current collector sheet. The negative electrode plate 3 comprises a negative electrode current collector sheet and a negative electrode mixture layer carried on each side of the current collector sheet.

The battery can 6 is sealed by crimping the opening edge thereof onto the circumference of a battery cover 7 with a gasket 8 interposed therebetween. The battery cover 7 serves as the positive electrode terminal.

One end of a positive electrode lead 9 is connected to the exposed part of the current collector sheet of the positive electrode plate 2, and the other end of the positive electrode lead 9 is connected to the battery cover 7. One end of a negative electrode lead 10 is connected to the exposed part of the current collector sheet of the negative electrode plate 3, and the other end of the negative electrode lead 10 is connected to the inner bottom face of the battery can 6. These leads can be connected, for example, by welding.

On top of the electrode plate group 5 is provided an upper insulating ring 11, which insulates the negative electrode plate 3 of the electrode plate group 5 from the battery cover 7. Under the electrode plate group 5 is provided a lower insulating ring 12, which insulates the positive electrode plate 2 of the electrode plate group 5 from the battery can 6.

(Battery 1)

(Preparation of Positive Electrode Plate)

Lithium cobaltate ($LiCoO_2$) was used as the positive electrode active material. $LiCoO_2$ was synthesized by mixing $Li_2CO_3$ and $Co_3O_4$ in a predetermined ratio and baking the mixture at 900° C. for 10 hours.

100 parts by weight of $LiCoO_2$ powder was mixed with 3 parts by weight of acetylene black (conductive agent) and 7 parts by weight of a fluorocarbon resin binder, and the mixture was suspended in an aqueous solution of carboxymethyl cellulose, to prepare a paste for forming a positive electrode mixture layer. This paste was applied to both sides of a 0.03-mm-thick aluminum foil, dried and rolled, to form a 0.18-mm-thick positive electrode plate. To the resultant positive electrode plate was attached an aluminum positive electrode lead.

(Preparation of Negative Electrode Plate)

100 parts by weight of artificial graphite powder was mixed with 5 parts by weight of styrene butadiene rubber (binder). The mixture was then suspended in an aqueous solution of carboxymethyl cellulose, to prepare a paste for forming a negative electrode mixture layer. This paste was applied to both sides of a 20-μm-thick copper foil, dried and rolled, to form a 0.19-mm-thick negative electrode plate. To the resultant negative electrode plate was attached a nickel negative electrode lead.

(Assembly of Battery)

A separator (thickness: 0.025 mm) comprising a polyethylene porous film was interposed between the positive electrode plate and the negative electrode plate thus obtained, and this combination was spirally rolled up, to form an electrode plate group. The electrode plate group provided with an upper insulating and a lower insulating ring was placed in a battery can with a diameter of 18 mm and a height of 65 mm.

A non-aqueous electrolyte was injected into the battery can, and the opening edge of the battery can was crimped onto the battery cover, with a gasket interposed therebetween, to complete a battery. The resultant battery had a diameter of 18 mm and a height of 65 mm. The nominal voltage of the battery was 3.6 V, and the nominal capacity thereof was 1600 mAh.

The organic solvent used for forming the non-aqueous electrolyte was a solvent mixture of ethylene carbonate, ethyl methyl carbonate, and diethyl carbonate in a volume ratio of 20:60:20. Lithium hexafluorophosphate ($LiPF_6$) was used as the first solute, and the concentration thereof was 1.2 mol/L. $Li_2B_4O_7$ was used as the second solute, and the concentration thereof was 0.005 mol/L.

(Batteries 2 to 9)

Batteries 2 to 9 were produced in the same manner as the battery 1, except that the concentration of the second solute ($Li_2B_4O_7$) in the non-aqueous electrolyte was varied as shown in Table 1.

(Comparative Batteries 1 to 2)

A comparative battery 1 was produced in the same manner as the battery 1, except that $Li_2B_4O_7$ was not added to the non-aqueous electrolyte.

A comparative battery 2 was produced in the same manner as the battery 1, except that 5 parts by weight of $Li_2B_4O_7$ per 100 parts by weight of $LiCoO_2$ was added to the paste for a positive electrode mixture layer and that $Li_2B_4O_7$ was not added to the non-aqueous electrolyte.

TABLE 1

|  | Concentration of $Li_2B_4O_7$ (mol/L) |
| --- | --- |
| Battery 1 | 0.005 |
| Battery 2 | 0.01 |
| Battery 3 | 0.025 |
| Battery 4 | 0.05 |
| Battery 5 | 0.1 |
| Battery 6 | 0.25 |
| Battery 7 | 0.5 |
| Battery 8 | 0.75 |
| Battery 9 | 1 |

These batteries 1 to 9 and comparative batteries 1 and 2 were subjected to a storage test, a high-rate discharge test and a cycle test.

(Storage Test)

In the storage test, the amount of gas produced and capacity recovery rate were measured as follows.

First, the respective batteries were charged at a constant current of 1120 mA at 25° C. until the battery voltage reached 4.2 V, and then charged at a constant voltage of 4.2 V for 2.5 hours. Subsequently, the charged batteries were discharged at a constant current of 320 mA (0.2 C) until the battery voltage dropped to 3 V. This cycling (hereinafter referred to as first charge/discharge cycling) was repeated three times. Thereafter, the batteries were charged in the same manner as above and stored at 60° C. for 7 days while being charged at a constant voltage of 4.25 V.

After the storage, some of the batteries were chosen and each of them was placed into a bag made of Teflon (registered trademark). At this time, a pin was also placed into each bag. The bag was filled with a predetermined amount of argon gas and then sealed. Using the pin, a hole was made in an upper part of the battery inside the bag, whereby the gas inside the battery was released in the bag. The amount of gas produced was determined from the peak area ratio of gas chromatography.

Other batteries after the storage were again subjected to the above-mentioned first charge/discharge cycling three times at 25° C. The discharge capacity at the third cycle was defined as after-storage discharge capacity. The discharge capacity at the third cycle of the first charge/discharge cycling performed before the storage was defined as before-storage discharge capacity. The percentage of the after-storage discharge capacity relative to the before-storage discharge capacity was defined as capacity recovery rate.

(High-rate Discharge Test)

In the high-rate discharge test, the ratio of the discharge capacity at a rate of 2 C to the discharge capacity at a rate of 0.2 C (hereinafter referred to as discharge capacity ratio) was obtained as follows. The discharge capacity ratio is the percentage of the discharge capacity at a rate of 2 C relative to the discharge capacity at a rate of 0.2 C (i.e., [(discharge capacity at 2 C)/(discharge capacity at 0.2 C)]×100).

The following charge/discharge was performed at a temperature of 25° C.

First, the respective batteries were subjected to the first charge/discharge cycling three times. Thereafter, at the fourth cycle, the discharge current was changed to 3200 mA (2 C) in the first charge/discharge cycling (hereinafter referred to as second charge/discharge cycling). The percentage of the discharge capacity at 2 C at the fourth cycle relative to the discharge capacity at 0.2 C at the third cycle was defined as discharge capacity ratio.

(Cycle Test)

In the cycle test, the capacity retention rates of the respective batteries were measured as follows.

The following charge/discharge was performed at a temperature of 25° C.

First, the respective batteries were subjected to the first charge/discharge cycling three times. Subsequently, the batteries were charged in the same manner as in the first charge/discharge cycling, and the charged batteries were discharged at a constant current of 1600 mA (1C) until the battery voltage dropped to 3 V. This cycling (hereinafter referred to as third charge/discharge cycling) was repeated 199 times. Thereafter, at the 203rd cycle (last cycle), the first charge/discharge cycling was performed once. The percentage of the discharge capacity at the 203rd cycle relative to the discharge capacity at the third cycle was defined as capacity retention rate.

Table 2 shows the results of the above tests.

TABLE 2

|  | Amount of gas produced (ml) | Capacity recovery rate (%) | Discharge capacity ratio (%) | Capacity retention rate (%) |
| --- | --- | --- | --- | --- |
| Battery 1 | 9.3 | 78.2 | 76.6 | 82.4 |
| Battery 2 | 6.8 | 81.3 | 77.2 | 83.8 |
| Battery 3 | 5.7 | 82.8 | 77.5 | 84.2 |
| Battery 4 | 5.2 | 83.5 | 77.6 | 84.6 |
| Battery 5 | 5.3 | 83.3 | 77.8 | 84.9 |
| Battery 6 | 5.3 | 83.1 | 76.7 | 84.5 |
| Battery 7 | 5.5 | 82.8 | 75.4 | 83.6 |
| Battery 8 | 5.5 | 82.7 | 74.8 | 82.8 |
| Battery 9 | 5.4 | 82.5 | 70.3 | 82.7 |

TABLE 2-continued

|  | Amount of gas produced (ml) | Capacity recovery rate (%) | Discharge capacity ratio (%) | Capacity retention rate (%) |
|---|---|---|---|---|
| Comparative battery 1 | 18.8 | 53.4 | 74.2 | 80.2 |
| Comparative battery 2 | 12.3 | 65.4 | 56.4 | 68.9 |

From the results of Table 2, it can be seen that in the batteries 1 to 9, the amounts of gas produced were smaller than that in the comparative battery 1 including no inorganic borate in the non-aqueous electrolyte. It should be noted that the non-aqueous electrolyte of the battery 9 contained a large amount of $Li_2B_4O_7$ Thus, the $Li_2B_4O_7$ was not completely dissolved and the undissolved $Li_2B_4O_7$ was dispersed in the organic solvent. However, even in the battery 9 using such non-aqueous electrolyte, the amount of gas produced was small in the same manner as in the batteries 1 to 8. Such results indicate that in the batteries 1 to 9, the inorganic borate contained in the non-aqueous electrolyte changed the surface form of the positive electrode active material and/or negative electrode active material. Specifically, the results indicate that a protective film derived from the inorganic borate was formed on the positive electrode active material surface and negative electrode active material surface, thereby suppressing the production of a large amount of gas by the decomposition of the non-aqueous electrolyte. Also, it was found that the capacity recovery rates of the batteries 1 to 9 were significantly improved in comparison with that of the comparative battery 1.

On the other hand, the high-rate discharge characteristic (discharge capacity ratio) of the battery 9 was slightly lower than those of the batteries 1 to 8. The reason is probably as follows. In the case of a discharge at a relatively low current such as 0.2 C, the inclusion of solid $Li_2B_4O_7$ in the non-aqueous electrolyte is found to cause no adverse effect. However, in the case of a discharge at a large current of 2 C, the solid $Li_2B_4O_7$ contained in the non-aqueous electrolyte hinders the movement of lithium ions, thereby increasing the polarization during the discharge and decreasing the capacity.

It should be noted that in the comparative battery 2, $Li_2B_4O_7$ was added to the positive electrode, not to the non-aqueous electrolyte. In the comparative battery 2, the amount of gas produced was small and the capacity recovery rate was improved, compared with the comparative battery 1. This is probably because some of the $Li_2B_4O_7$ contained in the positive electrode dissolved into the non-aqueous electrolyte so that a protective film derived from the inorganic borate was also formed on the negative electrode. However, when the comparative battery 2 is compared with the batteries 1 to 9, the comparative battery 2 has a larger gas production and a lower capacity recovery rate. Because the amount of $Li_2B_4O_7$ dissolved from the positive electrode into the non-aqueous electrolyte is small, a protective film derived from the inorganic borate is unlikely to be formed particularly on the negative electrode. That is, it can be considered that the effect of the inorganic borate is smaller when it is added to the positive electrode than when it is added to the non-aqueous electrolyte.

Further, the high-rate discharge characteristic of the comparative battery 2 was significantly lower than those of the batteries 1 to 9 and the comparative battery 1. This is because the positive electrode contains $Li_2B_4O_7$, which is an insulator. The insulator contained in the positive electrode reduces the electronic conductivity of the positive electrode, i.e., increases the resistance. Thus, when a large current at a rate of 2 C flows, the polarization becomes very high and the discharge capacity decreases significantly.

Furthermore, the capacity retention rate of the comparative battery 2 was also significantly lower than those of other batteries. The reason is probably as follows. In the measurements of the capacity retention rate, charge/discharge cycling is performed more than 200 times, and the positive electrode repeatedly expands and contracts in the charge/discharge cycling. In such positive electrode, the insulator $Li_2B_4O_7$ hinders the movement of electrons, so that the electrical resistance of the electrode plate rises in an early stage of the charge/discharge cycling. Therefore, the polarization of the positive electrode increases during the charge/discharge, thereby resulting in a decrease in capacity.

As described above, the addition of the inorganic borate to the non-aqueous electrolyte makes it possible to suppress the amount of gas production when batteries are stored while being continuously charged, and to improve the capacity recovery rate. Further, it is also possible to improve the high-rate discharge characteristics and cycle characteristics.

EXAMPLE 2

In this example, the kind and concentration of the second solute added to the non-aqueous electrolyte were varied.

(Batteries A1 to P2)

Batteries A1 to P2 were produced in the same manner as in the battery 1, except that the kind and concentration of the inorganic borate were varied as shown in Table 3.

TABLE 3

|  | Second solute | Concentration of second solute (mol/L) |
|---|---|---|
| Battery A1 | $Na_2B_4O_7$ | 0.02 |
| Battery A2 | $Na_2B_4O_7$ | 0.1 |
| Battery B1 | $Mg_3(BO_3)_2$ | 0.02 |
| Battery B2 | $Mg_3(BO_3)_2$ | 0.1 |
| Battery C1 | $LiBO_2$ | 0.05 |
| Battery C2 | $LiBO_2$ | 0.25 |
| Battery D1 | $Ca(BO_2)_2$ | 0.02 |
| Battery D2 | $Ca(BO_2)_2$ | 0.1 |
| Battery E1 | $KB_5O_7$ | 0.02 |
| Battery E2 | $KB_5O_7$ | 0.1 |
| Battery F1 | $Mg_2B_2O_5$ | 0.02 |
| Battery F2 | $Mg_2B_2O_5$ | 0.1 |
| Battery G1 | $Mg_2B_2O_4$ | 0.02 |
| Battery G2 | $Mg_2B_2O_4$ | 0.1 |
| Battery H1 | $MgB_4O_7$ | 0.02 |
| Battery H2 | $MgB_4O_7$ | 0.1 |
| Battery I1 | $ScBO_3$ | 0.02 |
| Battery I2 | $ScBO_3$ | 0.1 |
| Battery J1 | $Li_3BO_3$ | 0.05 |
| Battery J2 | $Li_3BO_3$ | 0.25 |
| Battery K1 | $KBO_2$ | 0.02 |
| Battery K2 | $KBO_2$ | 0.1 |
| Battery L1 | $NaBO_2$ | 0.02 |
| Battery L2 | $NaBO_2$ | 0.1 |
| Battery M1 | $LiB_5O_7$ | 0.05 |
| Battery M2 | $LiB_5O_7$ | 0.25 |
| Battery N1 | $Ca_2B_2O_5$ | 0.02 |
| Battery N2 | $Ca_2B_2O_5$ | 0.1 |
| Battery O1 | $Li_4B_2O_5$ | 0.05 |
| Battery O2 | $Li_4B_2O_5$ | 0.25 |
| Battery P1 | $Ba_2B_2O_4$ | 0.02 |
| Battery P2 | $Ba_2B_2O_4$ | 0.1 |

The batteries A1 to P2 were subjected to the same tests as those of Example 1. Table 4 shows the results. Table 4 also shows the result of the comparative battery 1.

TABLE 4

| | Amount of gas produced (ml) | Capacity recovery rate (%) | Discharge capacity ratio (%) | Capacity retention rate (%) |
|---|---|---|---|---|
| Comparative battery 1 | 18.8 | 53.4 | 74.2 | 80.2 |
| Battery A1 | 6.3 | 82.8 | 77.5 | 83.2 |
| Battery A2 | 6.5 | 81.5 | 76.8 | 82.7 |
| Battery B1 | 6.5 | 82.6 | 77.3 | 83.0 |
| Battery B2 | 6.7 | 81.8 | 76.7 | 82.5 |
| Battery C1 | 5.9 | 82.2 | 77.2 | 83.8 |
| Battery C2 | 5.5 | 82.9 | 77.7 | 84.6 |
| Battery D1 | 6.0 | 81.7 | 77.0 | 82.9 |
| Battery D2 | 6.3 | 81.2 | 76.5 | 82.2 |
| Battery E1 | 6.6 | 81.6 | 76.2 | 82.3 |
| Battery E2 | 6.3 | 82.3 | 77.0 | 82.9 |
| Battery F1 | 6.3 | 82.0 | 76.9 | 82.8 |
| Battery F2 | 6.6 | 81.6 | 76.5 | 82.3 |
| Battery G1 | 5.6 | 82.4 | 77.2 | 83.4 |
| Battery G2 | 5.8 | 81.9 | 76.6 | 82.8 |
| Battery H1 | 6.2 | 82.5 | 77.0 | 83.3 |
| Battery H2 | 6.4 | 82.1 | 76.7 | 82.9 |
| Battery I1 | 6.1 | 82.9 | 77.2 | 84.4 |
| Battery I2 | 6.5 | 82.3 | 76.5 | 83.5 |
| Battery J1 | 6.0 | 82.4 | 77.2 | 83.7 |
| Battery J2 | 5.6 | 83.2 | 77.8 | 84.9 |
| Battery K1 | 6.5 | 81.7 | 77.1 | 82.7 |
| Battery K2 | 6.8 | 81.4 | 76.8 | 82.2 |
| Battery L1 | 6.2 | 82.4 | 77.5 | 83.6 |
| Battery L2 | 6.5 | 81.8 | 77.2 | 82.9 |
| Battery M1 | 5.8 | 82.5 | 77.4 | 84.5 |
| Battery M2 | 5.5 | 83.3 | 77.9 | 85.2 |
| Battery N1 | 6.3 | 81.7 | 76.9 | 82.8 |
| Battery N2 | 6.9 | 81.0 | 76.4 | 82.2 |
| Battery O1 | 6.0 | 82.2 | 77.1 | 84.2 |
| Battery O2 | 5.7 | 82.9 | 77.5 | 84.7 |
| Battery P1 | 6.5 | 81.7 | 76.8 | 82.8 |
| Battery P2 | 6.8 | 81.1 | 76.5 | 82.4 |

From the results of Table 4, it can be seen that the amounts of gas produced in the batteries A1 to P2 were significantly smaller than that in the comparative battery 1. This indicates that various inorganic borates have the effect of suppressing gas production, although the degree of suppressing effect was varied depending on the kind of the inorganic borate added to the non-aqueous electrolyte.

Also, the batteries A1 to P2 exhibited good results in capacity recovery rate, discharge capacity ratio, and capacity retention rate, compared with the comparative battery 1.

In the batteries A1 to P2, the concentration of the inorganic borates was varied, but the change in the concentration of the second solute caused almost no difference when the kind of the second solute was the same.

EXAMPLE 3

In this example, the kind of the first solute and the second solute was varied.

(Batteries Q to Z)

Batteries Q to Z were produced in the same manner as in the battery 1, except that the kind and concentration of the first solute and the second solute were varied as shown in Table 5.

(Comparative Battery 3)

A comparative battery 3 was produced in the same manner as the comparative battery 1, except that the first solute was changed from LIPF$_6$ to LiBF$_4$.

TABLE 5

| | First solute | Second solute |
|---|---|---|
| Battery Q | NaPF$_6$ (0.2M) + LiN(C$_2$F$_5$SO$_2$)$_2$ (1M) | Li$_2$B$_4$O$_7$ (0.05M) |
| Battery R | (C$_2$H$_5$)$_4$NPF$_6$ (0.2M) + LiN(C$_2$F$_5$SO$_2$)$_2$ (1M) | Li$_2$B$_4$O$_7$ (0.05M) |
| Battery S | LiPF$_3$(C$_2$F$_5$)$_3$ (1.2M) | Li$_2$B$_4$O$_7$ (0.1M) |
| Battery T | LiAsF$_6$ (1.2M) | Li$_2$B$_4$O$_7$ (0.1M) |
| Battery U | LiSbF$_6$ (1.2M) | Li$_2$B$_4$O$_7$ (0.1M) |
| Battery V | LiPF$_6$ (0.5M) + LiPF$_3$(C$_2$F$_5$)$_3$ (0.5M) | Li$_2$B$_4$O$_7$ (0.1M) |
| Battery W | LiBF$_4$ (1.2M) | Li$_2$B$_4$O$_7$ (0.1M) |
| Battery X | LiBF$_4$ (1.2M) | LiBO$_2$ (0.1M) |
| Battery Y | LiBF$_4$ (1.2M) | ScBO$_3$ (0.1M) |
| Battery Z | LiBF$_4$ (1.2M) | Mg$_3$(BO$_3$)$_2$ (0.1M) |
| Comparative battery 3 | LiBF$_4$ (1.2M) | — |

The batteries Q to Z and the comparative battery 3 were subjected to the same tests as those of Example 1. Table 6 shows the results. Table 6 also shows the result of the comparative battery 1.

TABLE 6

| | Amount of gas produced (ml) | Capacity recovery rate (%) | Discharge capacity ratio (%) | Capacity retention rate (%) |
|---|---|---|---|---|
| Comparative battery 1 | 18.8 | 53.4 | 74.2 | 80.2 |
| Battery Q | 8.9 | 78.5 | 76.3 | 82.2 |
| Battery R | 8.5 | 79.3 | 76.7 | 82.4 |
| Battery S | 6.8 | 81.4 | 77.2 | 83.6 |
| Battery T | 6.2 | 82.4 | 77.5 | 84.0 |
| Battery U | 5.8 | 82.8 | 77.8 | 84.7 |
| Battery V | 7.2 | 80.5 | 76.9 | 83.2 |
| Battery W | 7.5 | 77.5 | 76.4 | 82.6 |
| Battery X | 8.1 | 76.8 | 75.7 | 81.7 |
| Battery Y | 7.8 | 77.2 | 76.1 | 82.2 |
| Battery Z | 8.5 | 76.4 | 75.2 | 81.3 |
| Comparative battery 3 | 21.1 | 47.7 | 73.0 | 78.9 |

From the results of Table 6, it can be seen that in the batteries Q to V where the first solute was not LiPF$_6$ and the second solute was included in the non-aqueous electrolyte, the amounts of gas were significantly small and the capacity recovery rates were markedly improved, compared with the comparative battery 1. Further, the batteries Q to V also exhibited good results in discharge capacity ratio and capacity retention rate.

Also, in the batteries W to Z where the first solute was LiBF$_4$ and various inorganic borates were added to the non-aqueous electrolytes, the amounts of gas were significantly small and the capacity recovery rates were also markedly improved, compared with the comparative battery 3. The batteries W to Z also exhibited good results in discharge capacity ratio and capacity retention rate.

EXAMPLE 4

In this example, LiFePO$_4$ was used as the positive electrode active material instead of LiCoO$_2$, and the kind and concentration of the second solute contained in the non-aqueous electrolyte were varied.

(Batteries AB1 to AL2)

LiFePO$_4$ (positive electrode active material) was synthesized as follows.

Lithium carbonate, iron oxalate, and ammonium dihydrogen phosphate were mixed in a predetermined ratio. The mixture was preliminarily sintered in a nitrogen flow at 300° C. for 12 hours. The resultant product was crushed and again sintered in a nitrogen flow at 600° C. for 24 hours, to produce $LiFePO_4$.

The resultant $LiFePO_4$ was again crushed, and 100 parts by weight of the $LiFePO_4$ powder was mixed with 15 parts by weight of acetylene black and 10 parts by weight of a fluorocarbon resin binder. The mixture was suspended in an aqueous solution of carboxymethyl cellulose, to prepare a paste for forming a positive electrode mixture layer. This paste was applied to both sides of a positive electrode current collector (thickness 0.03 mm) made of aluminum foil, dried, and rolled, to produce a positive electrode plate with a thickness of 0.13 mm.

A negative electrode plate was produced in the same manner as in the battery 1, except that the thickness thereof was reduced to 0.11 mm by decreasing the amount of the paste applied.

Batteries AB1 to AL2 were produced in the same manner as the battery 1, except that the positive and negative electrode plates thus produced were used and that the kind and concentration of the second solute were varied as shown in Table 7. In these batteries, the concentration of the first solute $LiPF_6$ in the non-aqueous electrolyte was made 1 mol/L.

(Comparative Battery AA)

A comparative battery AA was produced in the same manner as the battery 1, except that the positive electrode plate including $LiFePO_4$ as described above was used, that the thickness of the negative electrode plate was reduced to 0.11 mm in the same manner as above, and that no second solute was added to the non-aqueous electrolyte. The concentration of $LiPF_6$ in the non-aqueous electrolyte of the comparative battery AA was also made 1 mol/L.

TABLE 7

| | Second solute | Concentration of second solute (mol/L) |
|---|---|---|
| Comparative battery AA | — | — |
| Battery AB1 | $Li_2B_4O_7$ | 0.05 |
| Battery AB2 | $Li_2B_4O_7$ | 0.25 |
| Battery AC1 | $LiBO_2$ | 0.05 |
| Battery AC2 | $LiBO_2$ | 0.25 |
| Battery AD1 | $Li_3BO_3$ | 0.05 |
| Battery AD2 | $Li_3BO_3$ | 0.25 |
| Battery AE1 | $LiB_5O_7$ | 0.05 |
| Battery AE2 | $LiB_5O_7$ | 0.25 |
| Battery AF1 | $Li_4B_2O_5$ | 0.05 |
| Battery AF2 | $Li_4B_2O_5$ | 0.25 |
| Battery AG1 | $Na_2B_4O_7$ | 0.02 |
| Battery AG2 | $Na_2B_4O_7$ | 0.1 |
| Battery AH1 | $Mg_2B_2O_4$ | 0.02 |
| Battery AH2 | $Mg_2B_2O_4$ | 0.1 |
| Battery AI1 | $Ca_2B_2O_5$ | 0.02 |
| Battery AI2 | $Ca_2B_2O_5$ | 0.1 |
| Battery AJ1 | $Ba_2B_2O_4$ | 0.02 |
| Battery AJ2 | $Ba_2B_2O_4$ | 0.1 |
| Battery AK1 | $KB_5O_7$ | 0.02 |
| Battery AK2 | $KB_5O_7$ | 0.1 |
| Battery AL1 | $ScBO_3$ | 0.02 |
| Battery AL2 | $ScBO_3$ | 0.1 |

These batteries AB1 to AL2 and the comparative battery AA were subjected to the following storage test, high-rate discharge test, and cycle test.

(Storage Test)

In the first charge/discharge cycling, the charge current was changed from 1120 mA to 560 mA, and the charged battery was discharged at a current of 160 mA (0.2 C) until the battery voltage dropped to 2.5 V. In the same manner as in Example 1 except for these, a storage test was conducted and the amount of gas production and capacity recovery rate were obtained.

(High-rate Discharge Test)

In the first charge/discharge cycling, the charge current was changed from 1120 mA to 560 mA, and the charged battery was discharged at a current of 160 mA (0.2 C) until the battery voltage dropped to 2.5 V. In the second charge/discharge cycling, the charge current was changed to 560 mA, and the charged battery was discharged at a current of 1600 mA (2 C) until the battery voltage dropped to 2.5 V. In the same manner as in Example 1 except for these, the discharge capacity ratio was obtained.

(Cycle Test)

In the first charge/discharge cycling, the charge current was changed from 1120 mA to 560 mA, and the charged battery was discharged at a current of 160 mA (0.2 C) until the battery voltage dropped to 2.5 V. In the third charge/discharge cycling, the charge current was changed to 560 mA, and the charged battery was discharged at a current of 800 mA (1 C) until the battery voltage dropped to 2.5 V. In the same manner as in Example 1 except for these, the capacity retention rate was obtained.

Table 8 shows the results of these tests.

TABLE 8

| | Amount of gas produced (ml) | Capacity recovery rate (%) | Discharge capacity ratio (%) | Capacity retention rate (%) |
|---|---|---|---|---|
| Comparative battery AA | 2.50 | 81.2 | 65.3 | 85.2 |
| Battery AB1 | 0.77 | 97.3 | 68.2 | 91.4 |
| Battery AB2 | 0.38 | 98.2 | 68.7 | 92.1 |
| Battery AC1 | 1.15 | 96.4 | 67.6 | 90.6 |
| Battery AC2 | 0.77 | 97.3 | 68.0 | 91.5 |
| Battery AD1 | 0.96 | 96.7 | 67.2 | 91.3 |
| Battery AD2 | 0.58 | 97.6 | 67.7 | 91.7 |
| Battery AE1 | 1.15 | 96.1 | 67.5 | 90.4 |
| Battery AE2 | 0.77 | 96.8 | 68.1 | 91.2 |
| Battery AF1 | 0.96 | 97.0 | 67.7 | 90.7 |
| Battery AF2 | 0.58 | 97.8 | 68.3 | 91.4 |
| Battery AG1 | 0.96 | 95.8 | 66.7 | 87.8 |
| Battery AG2 | 1.54 | 95.2 | 66.1 | 87.1 |
| Battery AH1 | 0.77 | 96.3 | 67.3 | 88.3 |
| Battery AH2 | 1.35 | 95.8 | 66.9 | 87.4 |
| Battery AI1 | 1.15 | 95.9 | 67.2 | 88.5 |
| Battery AI2 | 1.54 | 95.4 | 66.7 | 87.9 |
| Battery AJ1 | 0.96 | 96.2 | 67.4 | 89.2 |
| Battery AJ2 | 1.35 | 95.6 | 66.9 | 88.4 |
| Battery AK1 | 0.58 | 96.9 | 67.6 | 90.0 |
| Battery AK2 | 1.15 | 96.4 | 67.1 | 89.5 |
| Battery AL1 | 0.77 | 96.7 | 67.4 | 89.7 |
| Battery AL2 | 1.15 | 96.1 | 66.8 | 88.8 |

From the results of Table 8, it can be seen that in the batteries AB1 to AL2 where the second solute was added to the non-aqueous electrolyte, the amounts of gas produced were significantly small and the capacity recovery rates were markedly improved, compared with the comparative battery AA. The results indicate that even in the case of using a positive electrode active material, such as $LiFePO_4$, which provides a lower average voltage than $LiCoO_2$ in charge/discharge, the amount of gas production is significantly reduced and the capacity recovery rate is markedly improved. The batteries AB1 to AL2 also exhibited good results in discharge capacity ratio and capacity retention rate, compared with the comparative battery AA.

EXAMPLE 5

In this example, $LiCoPO_4$ was used as the positive electrode active material instead of $LiCoO_2$, and the kind and concentration of the second solute contained in the non-aqueous electrolyte were varied.

(Batteries AN1 to AX2)

$LiCoPO_4$ (positive electrode active material) was synthesized as follows.

Lithium carbonate, cobalt oxalate, ammonium dihydrogen phosphate were mixed in a predetermined ratio. The mixture was preliminarily sintered at 300° C. in an air flow for 12 hours. The resultant product was crushed and sintered again at 600° C. in an air flow for 24 hours, to produce $LiCoPO_4$. Using the $LiCOPO_4$, a positive electrode plate was produced in the same manner as in Example 4.

Batteries AN1 to AX2 were produced in the same manner as the battery 1, except that this positive electrode plate was used, that the thickness of the negative electrode plate was made 0.1 mm, and that the kind and concentration of the second solute were varied as shown in Table 9. In these batteries, the concentration of the first solute $LiPF_6$ in the non-aqueous electrolyte was made 1 mol/L. The thickness of the negative electrode plate was reduced to 0.1 mm by decreasing the amount of the paste applied.

(Comparative Battery AM)

A comparative battery AM was produced in the same manner as the battery 1, except that the positive electrode plate including $LiCoPO_4$ as described above was used, that the thickness of the negative electrode plate was reduced to 0.1 mm, and that no second solute was added to the non-aqueous electrolyte. The concentration of $LiPF_6$ in the non-aqueous electrolyte of the comparative battery AM was also made 1 mol/L.

TABLE 9

|  | Second solute | Concentration of second solute (mol/L) |
|---|---|---|
| Comparative battery AM | — | — |
| Battery AN1 | $Li_2B_4O_7$ | 0.05 |
| Battery AN2 | $Li_2B_4O_7$ | 0.25 |
| Battery AO1 | $LiBO_2$ | 0.05 |
| Battery AO2 | $LiBO_2$ | 0.25 |
| Battery AP1 | $Li_3BO_3$ | 0.05 |
| Battery AP2 | $Li_3BO_3$ | 0.25 |
| Battery AQ1 | $LiB_5O_7$ | 0.05 |
| Battery AQ2 | $LiB_5O_7$ | 0.25 |
| Battery AR1 | $Li_4B_2O_5$ | 0.05 |
| Battery AR2 | $Li_4B_2O_5$ | 0.25 |
| Battery AS1 | $Na_2B_4O_7$ | 0.02 |
| Battery AS2 | $Na_2B_4O_7$ | 0.1 |
| Battery AT1 | $Mg_2B_2O_4$ | 0.02 |
| Battery AT2 | $Mg_2B_2O_4$ | 0.1 |
| Battery AU1 | $Ca_2B_2O_5$ | 0.02 |
| Battery AU2 | $Ca_2B_2O_5$ | 0.1 |
| Battery AV1 | $Ba_2B_2O_4$ | 0.02 |
| Battery AV2 | $Ba_2B_2O_4$ | 0.1 |
| Battery AW1 | $KB_5O_7$ | 0.02 |
| Battery AW2 | $KB_5O_7$ | 0.1 |
| Battery AX1 | $ScBO_3$ | 0.02 |
| Battery AX2 | $ScBO_3$ | 0.1 |

These batteries AN1 to AX2 and the comparative battery AM were subjected to the following storage test, high-rate discharge test and cycle test.

(Storage Test)

In the first charge/discharge cycling, the charge current was changed to 455 mA, and each battery was charged until the battery voltage reached 5.1 V and then charged at a constant voltage of 5.1 V for 2.5 hours. The charged battery was discharged at a current of 130 mA (0.2 C) until the battery voltage dropped to 3 V. Also, during the storage at 60° C., the voltage in the constant voltage charge was changed to 5.1 V. A storage test was conducted in the same manner as in Example 1 except for these, and the amount of gas production and the capacity recovery rate were obtained.

(High-rate Discharge Test)

In the first charge/discharge cycling, the charge current was changed to 455 mA, and each battery was charged until the battery voltage reached 5.1 V and then charged at a constant voltage of 5.1 V for 2.5 hours. The charged battery was discharged at a current of 130 mA (0.2 C) until the battery voltage dropped to 3 V. In the second charge/discharge cycling, the discharge current was changed to 1300 mA (2 C). In the same manner as in Example 1 except for these, the discharge capacity ratio was obtained.

(Cycle Test)

In the first charge/discharge cycling, the charge current was changed to 455 mA, and each battery was charged until the battery voltage reached 5.1 V and then charged at a constant voltage of 5.1 V for 2.5 hours. The charged battery was discharged at a current of 130 mA (0.2 C) until the battery voltage dropped to 3 V. In the third charge/discharge cycling, the discharge current was changed to 650 mA (1 C). In the same manner as in Example 1 except for these, the capacity retention rate was obtained.

Table 10 shows the results of these tests.

TABLE 10

|  | Amount of gas produced (ml) | Capacity recovery rate (%) | Discharge capacity ratio (%) | Capacity retention rate (%) |
|---|---|---|---|---|
| Comparative battery AM | 12.80 | 47.8 | 62.8 | 82.2 |
| Battery AN1 | 6.77 | 73.1 | 67.4 | 90.1 |
| Battery AN2 | 5.89 | 73.8 | 68.1 | 91.3 |
| Battery AO1 | 7.53 | 72.8 | 66.8 | 89.9 |
| Battery AO2 | 6.90 | 73.3 | 67.1 | 90.3 |
| Battery AP1 | 8.15 | 72.3 | 66.4 | 89.2 |
| Battery AP2 | 7.40 | 72.7 | 66.8 | 89.7 |
| Battery AQ1 | 7.53 | 72.6 | 66.8 | 87.9 |
| Battery AQ2 | 6.90 | 73.0 | 67.3 | 88.3 |
| Battery AR1 | 7.40 | 73.1 | 67.1 | 87.8 |
| Battery AR2 | 6.77 | 73.5 | 67.6 | 88.4 |
| Battery AS1 | 8.78 | 70.3 | 65.1 | 85.7 |
| Battery AS2 | 10.04 | 69.4 | 64.2 | 85.1 |
| Battery AT1 | 9.41 | 69.8 | 64.6 | 84.9 |
| Battery AT2 | 10.29 | 69.1 | 64.1 | 84.4 |
| Battery AU1 | 7.65 | 71.8 | 65.3 | 85.4 |
| Battery AU2 | 9.03 | 70.9 | 64.8 | 84.8 |
| Battery AV1 | 8.15 | 71.2 | 64.9 | 85.1 |
| Battery AV2 | 8.78 | 70.7 | 64.5 | 84.6 |
| Battery AW1 | 8.65 | 70.4 | 65.3 | 85.4 |
| Battery AW2 | 10.16 | 69.9 | 64.7 | 84.8 |
| Battery AX1 | 8.28 | 71.7 | 65.8 | 86.3 |
| Battery AX2 | 8.78 | 71.1 | 65.2 | 85.7 |

From the results of Table 10, it can be seen that in the batteries AN1 to AX2 where the second solute was added to the non-aqueous electrolyte, the amounts of gas produced were significantly small and the capacity recovery rates were markedly improved, compared with the comparative battery AM. The results indicate that even in the case of using a positive electrode active material, such as $LiCoPO_4$, which provides a higher average voltage than $LiCoO_2$ the amount of gas production is significantly reduced and the capacity recovery rate is markedly improved. The batteries AN1 to AX2 also exhibited good results in discharge capacity ratio and capacity retention rate, compared with the comparative battery AM.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte comprising: a first solute; a second solute; and an organic solvent dissolving said first solute and said second solute, wherein said first solute is a salt having at least one fluorine atom in an anion moiety thereof, and said second solute is an inorganic borate having at least one boron atom and at least one oxygen atom in an anion moiety thereof, and said inorganic borate comprises at least one selected from the group consisting of:

a diborate represented by $M_w(B_2O_5)$ (4)

where M is an alkali metal or an alkaline earth metal; when M is an alkali metal, w=4, and when M is an alkaline earth metal, w=2;

a pentaborate represented by $LB_5O_7$ (5)

where L is an alkali metal; and a hypoborate represented by $M_u(B_2O_4)$ (6)

where M is an alkali metal or an alkaline earth metal; when M is an alkali metal, u=4, and when M is an alkaline earth metal, u=2.

2. The non-aqueous electrolyte in accordance with claim 1, wherein the anion moiety of said first solute is at least one selected from the group consisting of $PF_6^-$, $BF_4^-$, $AsF_6^-$, $SbF_6^-$, and $[PF_\alpha(C_\beta X_{(2\beta+1)})_{(6-\alpha)}]^-$ where X is H or F, $\alpha$ is an integer from 1 to 5, and $\beta$ is an integer from 1 to 5.

3. The non-aqueous electrolyte in accordance with claim 1, wherein the non-aqueous electrolyte has a second solute concentration of 0.005 mol/L or more and 0.75 mol/L or less.

4. An electrochemical device comprising at least two electrodes, a separator interposed between said at least two electrodes, and the non-aqueous electrolyte of claim 1.

* * * * *